(12) United States Patent  
Um (10) Patent No.: US 9,666,153 B2
(45) Date of Patent: May 30, 2017

(54) DRIVING METHOD AND DRIVING DEVICE FOR LIQUID CRYSTAL PIXEL UNIT, AND LIQUID CRYSTAL DISPLAY DEVICE

(71) Applicant: BOE TECHNOLOGY GROUP CO., LTD., Beijing (CN)

(72) Inventor: Yoonsung Um, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 310 days.

(21) Appl. No.: 14/382,172

(22) PCT Filed: Dec. 3, 2013

(86) PCT No.: PCT/CN2013/088439
§ 371 (c)(1),
(2) Date: Aug. 29, 2014

(87) PCT Pub. No.: WO2015/000258
PCT Pub. Date: Jan. 8, 2015

(65) Prior Publication Data
US 2015/0325194 A1    Nov. 12, 2015

(30) Foreign Application Priority Data
Jul. 5, 2013    (CN) .......................... 2013 1 0282804

(51) Int. Cl.
*G09G 3/36*    (2006.01)
*G02F 1/133*    (2006.01)
(Continued)

(52) U.S. Cl.
CPC ......... *G09G 3/3688* (2013.01); *G02F 1/1368* (2013.01); *G02F 1/13306* (2013.01);
(Continued)

(58) Field of Classification Search
CPC ........... G02F 1/13306; G02F 1/136213; G02F 1/1368; G09G 3/3655; G09G 3/3659;
(Continued)

(56) References Cited

U.S. PATENT DOCUMENTS 6,407,729 B1 * 6/2002 Moon .................. G09G 3/3648
345/205
6,661,488 B1 * 12/2003 Takeda .............. G02F 1/133707
349/117
(Continued)

FOREIGN PATENT DOCUMENTS

CN    101354512 A    1/2009
CN    101510414 A    8/2009
(Continued)

OTHER PUBLICATIONS

Chinese Search Report corresponding to application No. PCT/CN2013/088439.
(Continued)

*Primary Examiner* — Amare Mengistu
*Assistant Examiner* — Stacy Khoo
(74) *Attorney, Agent, or Firm* — Nath, Goldberg & Meyer; Joshua B. Goldberg (57) ABSTRACT

The present invention provides a driving method and a driving device for liquid crystal pixel unit, and a liquid crystal display device. In the driving method, the liquid crystal pixel unit comprises a first pixel electrode, a second pixel electrode and a first shared capacitor; the driving method comprises: providing a charging connection signal for charging the first and second pixel electrodes to an equivalent voltage using the data signal; providing a shared connection signal with an interval of a first time after the charging connection signal is finished, electrically connecting the first shared capacitor with first pixel electrode and
(Continued)

changing the voltage on the first pixel electrode; said first time is larger than or equal to $1/10$ and smaller than or equal to $3/4$ of the display period. The driving method is applicable to the liquid crystal display device of VA mode, especially to that of CS-SPVA mode.

16 Claims, 3 Drawing Sheets

(51) Int. Cl.
G02F 1/1362 (2006.01)
G02F 1/1368 (2006.01)

(52) U.S. Cl.
CPC ..... *G02F 1/136213* (2013.01); *G09G 3/3655* (2013.01); *G09G 3/3659* (2013.01); *G09G 3/3614* (2013.01); *G09G 2300/0426* (2013.01); *G09G 2300/0447* (2013.01); *G09G 2300/0491* (2013.01); *G09G 2300/0823* (2013.01); *G09G 2300/0852* (2013.01); *G09G 2310/08* (2013.01); *G09G 2320/0233* (2013.01)

(58) Field of Classification Search
CPC ......... G09G 3/3688; G09G 2300/0426; G09G 2300/0447; G09G 2300/0491; G09G 2300/0823; G09G 2300/0852; G09G 2310/08; G09G 2320/0233; G09G 3/3614

USPC ............ 345/87, 211; 349/43, 123, 139, 144
See application file for complete search history.

(56) References Cited

U.S. PATENT DOCUMENTS

| | | | |
|---|---|---|---|
| 2003/0136971 A1* | 7/2003 | Rhee | G02F 1/136227 257/98 |
| 2008/0024689 A1* | 1/2008 | Ahn | G02F 1/136213 349/43 |
| 2008/0224980 A1* | 9/2008 | Senda | G09G 3/3648 345/96 |
| 2011/0267567 A1 | 11/2011 | Ting et al. | |
| 2012/0033148 A1 | 2/2012 | Yang et al. | |
| 2013/0265288 A1* | 10/2013 | Woo | G09G 3/3614 345/209 |

FOREIGN PATENT DOCUMENTS

| | | |
|---|---|---|
| CN | 101581858 A | 11/2009 |
| CN | 103353680 A | 10/2013 |
| KR | 20100042437 A | 4/2010 |

OTHER PUBLICATIONS

Office Action dated Apr. 3, 2015 corresponding to Chinese application No. 201310282804.0.

* cited by examiner

DRIVING METHOD AND DRIVING DEVICE FOR LIQUID CRYSTAL PIXEL UNIT, AND LIQUID CRYSTAL DISPLAY DEVICE

FIELD OF THE INVENTION

The present invention relates to the field of liquid crystal display technology, and in particular to driving method and driving device for liquid crystal pixel unit.

BACKGROUND OF THE INVENTION

Many liquid crystal pixel units are provided in a liquid crystal display device of VA (Vertical Alignment) mode, each liquid crystal pixel unit corresponds to a smallest display point, which can be individually controlled, on the display screen, that is, each liquid crystal pixel unit corresponds a sub-pixel. In each liquid crystal pixel unit, the liquid crystal molecules will be driven to be inclined toward certain directions (orientations) from vertical arrangements (i.e., perpendicular to the surface of the display panel). The filtering capability of a liquid crystal layer is determined by the angles between the liquid crystal molecules and lights. Thus, if all the liquid crystal molecules in a liquid crystal pixel unit take a same direction (the same orientation/inclination angle), the liquid crystal pixel unit renders varied brightness when viewed from different positions; in other words, lights emitted from the liquid crystal pixel unit to different positions have different directions, and therefore have different angles with the liquid crystal molecules), the display quality is affected.

Practically, each liquid crystal pixel unit is divided into a plurality of domains, the directions of the liquid crystal molecules within each domain are the same, and the directions of the liquid crystal molecules among different domains are different (i.e. have different orientations/inclination angles). The brightness difference of the liquid crystal pixel unit viewed from different locations may be reduced by an average effect of the domains. The liquid crystal pixel unit may divided into domains in two different ways: firstly, the orientations of the liquid crystal molecules may be altered (i.e. setting a plurality of "orientation domains"), which can be implemented by setting convexity or different alignment layers, or by changing shapes of the pixel electrodes; secondly, a plurality of pixel electrodes applied with different voltages may be provided in each liquid crystal pixel unit (i.e. the content of a sub-pixel is displayed using the plurality of pixel electrodes), such that the inclination angles of the liquid crystal molecules corresponding to different pixel electrodes are different from each other. These two ways can be combined, for example in a liquid crystal display device of SPVA (Super Patterned Vertical Alignment) mode, a plurality of pixel electrodes are provided for each liquid crystal pixel unit, and each pixel electrode corresponds to several orientation domains.

Figure 1:
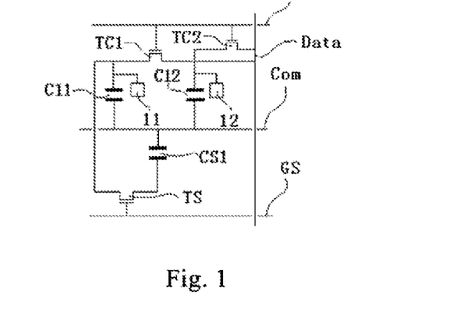
FIG. 1 is an equivalent circuit diagram of the liquid crystal pixel unit of CS-SPVA mode.
Figure 2:
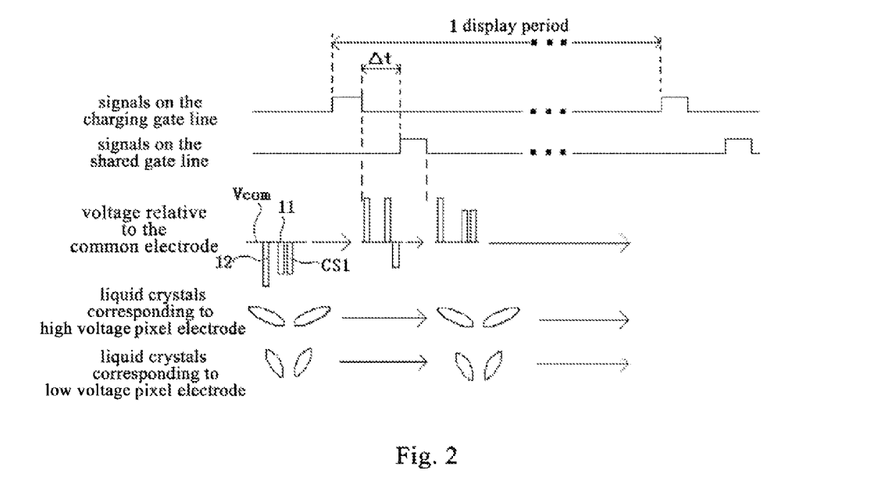
FIG. 2 is a schematic timing sequence of existing driving method for liquid crystal pixel unit.

A CS-SPVA mode liquid crystal display device using CS (charge share) technology is proposed for controlling the voltage of each pixel electrodes in the liquid crystal pixel unit. As shown in FIG. 1, a low-voltage pixel electrode 11 and a high-voltage pixel electrode 12 are provided in each liquid crystal pixel unit of CS-SPVA mode, the two pixel electrodes 11 and 12 are connected with a data line Data respectively through charging TFT TC1, TC2 which are controlled by a charging gate line GC; the low-voltage pixel electrode 11 is also connected to the source of a first shared TFT TS which is controlled by a shared gate line GS, the drain of the first shared TFT TS is connected to one end of a first shared capacitor CS1, the other end of the first shared capacitor CS1 is connected with a common electrode line Com. As shown in FIG. 2, when a display period (frame) of the liquid crystal pixel unit is initiated, the charging gate line GC provides a charging connection signal, the two pixel electrodes 11 and 12 are charged to a same voltage through the data line Data. With an interval of a short first time $\Delta t$ (about several microseconds to tens of microseconds, equivalent to several percent of the display period) after the charging connection signal is finished, a shared connection signal is provided by the shared gate line GS, such that the low-voltage pixel electrode 11 shares charges with the first shared capacitor CS1, the voltage on the low-voltage pixel electrode 11 is reduced (because of polarity reversion, the polarity of charges in the low-voltage pixel electrode 11 and the first shared capacitor CS1 are reverse). Of course, above is only one example for the CS-SPVA mode liquid crystal display device, the circuit structure, number of pixel electrodes, number of the orientation domains of each pixel electrode may be altered.

Note that the "voltage" mentioned in the liquid crystal display refers to the voltage for driving the liquid crystal pixel unit, "high voltage" and "low voltage" for the pixel electrodes are not absolute voltage values (in other words, are not compared to ground), but refer to an absolute value of the difference between the pixel electrode voltage and a common electrode voltage. The larger the absolute value of the difference between the pixel electrode voltage and the common electrode voltage (the former may be larger or lower than the latter), the higher the pixel electrode voltage, otherwise the pixel electrode voltage may be lower. The "polarity" of voltage is also not compared to the ground voltage, but to the common electrode voltage. For example, "the pixel electrode voltage and the shared capacitor voltage have opposite polarities", means that one of the pixel electrode voltage and the shared capacitor voltage is larger than the common electrode voltage, and the other is lower than the common electrode voltage.

While the existing liquid crystal display device of CS-SPVA mode can achieve the effect of a plurality of domains, but the number of domains is still insufficient; meanwhile, due to limits of manufacturing process and the like, there may be errors in the capacitance values of the storage capacitor and the shared capacitor of the liquid crystal display device, which will cause inaccurate voltage on the pixel electrode, and has impact on display quality.

SUMMARY OF THE INVENTION

The technical problem to be solved by the present invention is, for the unsatisfactory display quality with conventional liquid crystal pixel unit, providing a driving method and a driving device for liquid crystal pixel unit with improved display quality.

The technical solution adopted by the present invention to overcome above problem is a driving method for liquid crystal pixel unit, the liquid crystal pixel unit comprises a first pixel electrode, a second pixel electrode and a first shared capacitor; the driving method comprises:

providing a charging connection signal for charging the first and second pixel electrodes to an equivalent voltage using the data signal;

providing a shared connection signal with an interval of a first time after the charging connection signal is finished, connecting the first shared capacitor with the first pixel electrode and changing the voltage on the first pixel electrode; said first time is larger than or equal to 1/10 of the display period and smaller than or equal to 3/4 of the display period.

Said "display period" is the time interval between a refreshing and an adjacent refreshing (between adjacent alterations of driving voltage) of a liquid crystal pixel unit, i.e. the period between the start timings of two adjacent charging connection signals. Within a same liquid crystal display device, the display periods of liquid crystal pixel units in different rows (or columns) are not synchronous, while the time lengths of the display periods of liquid crystal pixel units are equivalent to each other. Typically, a display period is the duration of an image "frame" (about several milliseconds to tens of milliseconds).

In existing driving method for liquid crystal pixel unit, the interval between the shared connection signal and the charging connection signal is very short for providing different voltage on two pixel electrodes, so as to obtain divided domains as soon as possible; that is, the time when the low-voltage pixel electrode is applied with data signal voltage is very short, such that the low-voltage pixel electrode is almost always applied with the changed voltage, and may have no impact on display effect for the short period under the data signal voltage. As to the driving method for liquid crystal pixel unit according to the present invention, the interval between the shared connection signal and the charging connection signal (i.e. the first time) is in a range of 1/10 to 3/4 of the display period. Obviously, according to the present invention, the first time is not shortened to provide divided domains as soon as possible, to the contrary, the first time is extended intentionally to achieve better display effect. Firstly, since the first time is extended, the time when the first pixel electrode (i.e. the low-voltage pixel electrode) is applied with data signal voltage is longer (at least 1/10 of the display period). When the charging connection signal arrives, voltage on the first pixel electrode is changed, and the changed voltage is kept for a comparatively long time (at least 1/4 of the display period). In other words, within a display period, the first pixel electrode will be kept on two different voltages respectively for a comparatively long time, the corresponding liquid crystal molecules will be hold at two different inclination angles respectively for a long time, such that the display effect caused by the first pixel electrode is an average of the display effect in two time periods. The number of domains is doubled by the first pixel electrode using a "time division" mechanism, and the display effect is improved. In the prior art, persons skilled in the art only proposed to change the orientations of the liquid crystal molecules in different domains, but not to make the liquid crystal molecules in one domain render two different states in a display period. Moreover, as mentioned above, display effect is also influenced by errors in the capacitance values of the storage capacitor, shared capacitor and etc. According to the method of the present invention, the display effect can be altered by adjusting the first time (and therefore setting the duration ratio of the two different voltages on the first pixel electrode) so as to compensate above errors and achieve better display effect.

Preferably, the liquid crystal pixel unit is a liquid crystal pixel unit of VA mode.

Preferably, the first pixel electrode is connected to the drain of a first charging thin film transistor, the second pixel electrode is connected to the drain of a second charging thin film transistor; the sources of the first charging thin film transistor and the second charging thin film transistor are connected with a same data line, the gates thereof are connected with a same charging gate line, said data line is used for providing data signal, said charging gate line is used for providing charging connection signal.

Preferably, the first pixel electrode is connected to one end of the first shared capacitor through a shared thin film transistor, the other end of the first shared capacitor is connected with a common electrode line, the gate of the shared thin film transistor is connected with a shared gate line, said shared gate line is used for providing the shared connection signal.

Preferably, the liquid crystal pixel unit further comprises: a second shared capacitor, said second shared capacitor is electrically connected with the first pixel electrode on arrival of the shared connection signal, and the voltage on the second pixel electrode is changed.

Preferably, the first pixel electrode is connected to one end of the first shared capacitor through a shared thin film transistor, the other end of the first shared capacitor is connected with a common electrode line, the gate of the shared thin film transistor is connected with a shared gate line, said shared gate line is used for providing the shared connection signal; one end of the second shared capacitor is connected with the second pixel electrode, and the other end of the second shared capacitor is connected to one end of the first shared capacitor away from the common electrode line.

Preferably, the liquid crystal pixel unit performs polarity reversion in two adjacent display periods.

Preferably, each pixel electrode corresponds to at least two orientation domains.

Preferably, said first time is larger than or equal to 1/10 of the display period and smaller than or equal to 1/4 of the display period.

Preferably, said first time is larger than or equal to 1/4 of the display period and smaller than or equal to 3/4 of the display period.

The technical solution adopted by the present invention to overcome the problem in the prior art is a driving device for liquid crystal pixel unit, the liquid crystal pixel unit comprises a first pixel electrode, a second pixel electrode and a first shared capacitor; the driving device comprises:

a data driving module configured to provide data signal to the liquid crystal pixel unit;

a charging driving module configured to provide charging connection signal to the liquid crystal pixel unit for charging the first and second pixel electrodes to an equivalent voltage using the data signal;

a shared driving module configured to provide a shared connection signal to the liquid crystal pixel unit for connecting the first shared capacitor with the first pixel electrode and changing the voltage on the first pixel electrode;

a time control module configured to control the shared driving module to provide a shared connection signal to the liquid crystal pixel unit with an interval of a first time after the charging connection signal is finished; said first time is larger than or equal to 1/10 of the display period and smaller than or equal to 3/4 of the display period.

The driving device for liquid crystal pixel unit according to the present invention has a time control module to perform above driving method for liquid crystal pixel unit, which can provide an increased number of domains and compensate the capacitance errors, such that the display effect is improved.

The present invention also provides a liquid crystal display device comprising above driving device for liquid crystal pixel unit.

Preferably, the liquid crystal pixel unit is a liquid crystal pixel unit of VA mode.

Preferably, the liquid crystal pixel unit further comprises: a second shared capacitor, said second shared capacitor is electrically connected with the first pixel electrode on arrival of the shared connection signal, and the voltage on the second pixel electrode is changed.

Preferably, the data signal provided from the data driving module to the liquid crystal pixel unit has reversed polarities in two adjacent display periods.

The driving method and device for liquid crystal pixel unit according to the present invention are applicable to the liquid crystal display device of VA mode, more preferably to that of CS-SPVA mode.

Reference signs: 11, low-voltage pixel electrode; 12, high-voltage pixel electrode; GC, charging gate line; GS, shared gate line; Com, common electrode line; Data, data line; TC1, first charging thin film transistor; TC2, second charging thin film transistor; TS, shared thin film transistor; CS1, first shared capacitor; CS2, second shared capacitor; C11, first storage capacitor; C12, second storage capacitor; Δt, first time.

DETAILED DESCRIPTION OF THE EMBODIMENTS

The technical solutions in the embodiments of the present invention will be described in detail below with reference to the accompanying drawings and specific embodiments of the present invention, for those skilled in the art to understand the solutions of the present invention thoroughly.

Embodiment 1

The present embodiment provides a driving method for liquid crystal pixel unit, the liquid crystal pixel unit comprises a first pixel electrode, a second pixel electrode and a first shared capacitor; the driving method comprises:

providing a charging connection signal for charging the first and second pixel electrodes to an equivalent voltage using the data signal;

providing a shared connection signal with an interval of a first time after the charging connection signal is finished, connecting the first shared capacitor with the first pixel electrode and changing the voltage on the first pixel electrode; said first time is larger than or equal to 1/10 of the display period and smaller than or equal to 3/4 of the display period.

In existing driving method for liquid crystal pixel unit, the interval between the shared connection signal and the charging connection signal is very short for providing different voltages on two pixel electrodes, so as to obtain divided domains as soon as possible; that is, the time when the low-voltage pixel electrode is applied with data signal voltage is very short, such that the low-voltage pixel electrode is almost always applied with the changed voltage, and may have no impact on display effect for the short period under the data signal voltage. As to the driving method for liquid crystal pixel unit according to the present embodiment, the interval (i.e. the first time) between the shared connection signal and the charging connection signal is in a range of 1/10 to 3/4 of the display period. Obviously, according to the present embodiment, the first time is not shortened to provide divided domains as soon as possible, to the contrary, the first time is extended intentionally to achieve better display effect. Firstly, since the first time is extended, the time when the first pixel electrode (i.e. the low-voltage pixel electrode) is applied with data signal voltage is longer (at least 1/10 of the display period). When the charging connection signal arrives, voltage on the first pixel electrode is changed, and the changed voltage is kept for a comparatively long time (at least 1/4 of the display period). In other words, within a display period, the first pixel electrode will be kept on two different voltages respectively for a comparatively long time, the corresponding liquid crystal molecules will be hold at two different inclination angles respectively for a long time, such that the display effect caused by the first pixel electrode is an average of the display effect in two time periods. The number of domains is doubled by the first pixel electrode using a "time division" mechanism, and the display effect is improved. In the prior art, persons skilled in the art only proposed to change the orientations of the liquid crystal molecules in different domains, but not to make the liquid crystal molecules in one domain render two different states in a display period. Moreover, as mentioned above, display effect is also influenced by errors in the capacitance values of the storage capacitor, shared capacitor and etc. According to the method of the present embodiment, the display effect can be altered by adjusting the first time (and therefore setting the duration ratio of the two different voltages on the first pixel electrode) so as to compensate above errors and achieve better display effect.

Embodiment 2

Figure 3:
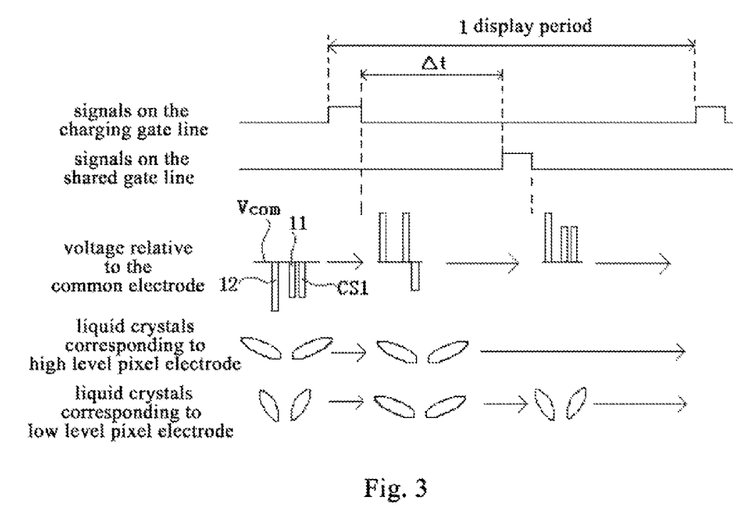
FIG. 3 is a schematic timing sequence of the driving method for liquid crystal pixel unit according to embodiment 2 of the present invention.

As shown in FIGS. 1 and 3, the present embodiment provides a driving method for liquid crystal pixel unit.

As shown in FIG. 1, each liquid crystal pixel unit comprises a low-voltage pixel electrode 11 (the first pixel electrode) and a high-voltage pixel electrode 12 (the second pixel electrode).

Preferably, the pixel electrodes 11 and 12 are connected with data line Data through two charging thin film transistors (the first and second charging thin film transistors TC1 and TC2) respectively, the gates of the two charging thin film transistors TC1 and TC2 are connected with a charging gate line GC for providing charging connection signal. That is, charging of the pixel electrodes 11 and 12 are individually controlled by the first and second charging thin film transistors TC1 and TC2, the first and second charging thin film transistors TC1 and TC2 are controlled by the charging gate line GC.

Preferably, the low-voltage pixel electrode 11 is also connected to the source of a shared thin film transistor TS, the drain of the shared thin film transistor TS is connected to one end of a first shared capacitor CS1, the other end of the first shared capacitor CS1 is connected with a common electrode line Com, the gate of the shared thin film transistor TS is connected with a shared gate line GS for supplying shared connection signal. The source and drain of the shared thin film transistor TS are two electrodes coupled by the active region of the TFT and have no essential difference, i.e. when the current flowing in the shared thin film transistor TS changes direction, the source and drain remain the same.

Charge sharing between the low-voltage pixel electrode 11 and the first shared capacitor CS1 can be implemented by adding a shared capacitor and a shared thin film transistor TS.

Note that the shared capacitor of other form is also applicable as long as the voltage on the low-voltage pixel electrode 11 can be changed under control of the shared connection signal.

Preferably, the liquid crystal pixel unit is a liquid crystal pixel unit of VA mode; i.e. the pixel electrodes 11 and 12 are both disposed on the array substrate, and the common electrode is disposed on the color filter. The liquid crystal molecules are distributed along the direction perpendicular to the surface of the display panel without driving voltage, and are inclined when the driving voltage is applied.

The domain number of a liquid crystal pixel unit can be increased by a "time division" manner using the driving method for liquid crystal pixel unit according to the present embodiment. Increase of domain number has most significant improvement to the display effect of VA mode liquid crystal pixel unit, therefore the present invention is preferable to the liquid crystal pixel unit of VA mode.

Preferably, each pixel electrode corresponds to at least two orientation domains. In other words, the liquid crystal molecules corresponding to one pixel electrode will be inclined to at least two different directions under the applied driving voltage, wherein the liquid crystal molecules inclined to a same direction belong to an orientation domain. Method for dividing the liquid crystal pixel unit into several orientation domains is various and known, such as by setting convexity or alignment layers in the liquid crystal pixel unit, the details thereof are omitted here.

The driving method for liquid crystal pixel unit according to the present embodiment can increase the domain number of a liquid crystal pixel unit, and if each pixel electrode itself corresponds to a plurality of domains, the effect of increase will be more significant. For example, if each pixel electrode corresponds to 4 orientation domains, then the liquid crystal pixel unit has 8 domains by itself, when the driving method for liquid crystal pixel unit according to the present embodiment is applied, the domain number of the low-voltage pixel electrode 11 is doubled to be 8 domains, and the liquid crystal pixel unit can provide 12 domains in total.

Other known structures such as the first storage capacitor C11 and the second storage capacitor C12 connected with the low-voltage pixel electrode 11 and the high-voltage pixel electrode 12 respectively shall be included in the liquid crystal pixel unit, the details thereof are omitted here.

Obviously, each liquid crystal pixel unit corresponds to a smallest display point, which can be individually controlled (pixel or sub-pixel), on the liquid crystal display device. Each liquid crystal display device practically comprises many liquid crystal pixel units arranged in an array, each charging gate line GC and each shared gate line GS are connected with a plurality of liquid crystal pixel units in a row, and a data line Data is connected with a plurality of liquid crystal pixel units in a column. Driving of the liquid crystal pixel units are performed simultaneously to the plurality of cells, and the present embodiment is exemplified as driving one liquid crystal pixel unit.

As shown in FIG. 3, the driving method for liquid crystal pixel unit according to the present embodiment comprises the following steps S01 to S03.

S01, providing a charging connection signal through the charging gate line GC, for charging the low-voltage pixel electrode 11 and the high-voltage pixel electrode 12 to the data signal voltage using the data line Data.

At start of a pixel period, a high level signal (i.e. the charging connection signal) is provided to the charging gate line GC, turning on the first and second charging thin film transistors TC1 and TC2, such that the data signal (that is the data signal for the corresponding liquid crystal pixel unit) on the data line Data is supplied to the high-voltage pixel electrode 12 and the low-voltage pixel electrode 11, the two pixel electrodes 11 and 12 are both charged to the data signal voltage. The charging connection signal lasts for a short time, typically for about several microseconds to tens of microseconds, since charging of the pixel electrodes can be finished quickly.

Preferably, the liquid crystal pixel unit performs polarity reversion in two adjacent display periods.

That is, the driving method for liquid crystal pixel unit preferably performs polarity reversion in each display period with respect to the polarity of previous display period; that is, the polarity of driving voltage applied on the liquid crystal pixel unit is opposite in two adjacent display periods. For example, if in a display period, the difference between the pixel electrode voltage and the common electrode voltage is larger than 0V, then in the previous and next display periods, the difference between the pixel electrode voltage and the common electrode voltage is smaller than 0V, and vice versa.

Besides the polarity reversion of each liquid crystal pixel unit as mentioned above, in the liquid crystal display device, the polarity reversion may be performed with respect to a frame, a column or a row of pixels.

As shown in FIG. 3, before the step S01, the low-voltage pixel electrode 11 and the high-voltage pixel electrode 12 are kept at the voltage at the last time of previous display period, the polarity of voltage on the first shared capacitor CS1 and that on the low-voltage pixel electrode 11 are the same (e.g. both the voltages being lower than the common electrode voltage). After charging of the electrodes is finished, the low-voltage pixel electrode 11 and the high-voltage pixel electrode 12 both reach the data signal voltage of the present display period which has opposite polarity to that of the previous display period (e.g. being higher than the common electrode voltage). At this time, the voltage on the first shared capacitor CS1 remains the same, such that the polarity of voltage on the low-voltage pixel electrode 11 is opposite to that on the first shared capacitor CS1.

S02, providing a shared connection signal through the charging gate line GC with an interval of a first time $\Delta t$ after the charging connection signal is finished, for connecting (i.e. electrically connecting) the first shared capacitor CS1 with the low-voltage pixel electrode 11 and changing the voltage on the low-voltage pixel electrode 11; said first time $\Delta t$ is larger than or equal to $\frac{1}{10}$ of the display period and smaller than or equal to $\frac{3}{4}$ of the display period.

In other words, after charging is finished, a high level signal (i.e. the shared connection signal) is provided to the shared gate line GS with a comparatively long period (about a fraction of millisecond to several milliseconds), the shared thin film transistor TS is turned on, the first shared capacitor CS1 is electrically connected with the low-voltage pixel electrode 11 and charges are shared therebetween. Voltage on the low-voltage pixel electrode 11 is "pulled down" to be closer to the common electrode voltage and is therefore distinct from the voltage on the high-voltage pixel electrode 12.

In the prior art, in order to obtain divided domains as soon as possible, the interval between the charging connection signal and the shared connection signal is only tens of microsecond, which means the voltage on the low-voltage pixel electrode 11 is kept on the data signal voltage for a short time, and is then pulled down. Since rotation of the liquid crystal molecules requires certain time, and the liquid crystal molecules corresponding to the low-voltage pixel electrode 11 may not rotate (or rotate to an extent that may not affect the visual effect) in such short time. Thus, as for the display effect, the low-voltage pixel electrode 11 may be regarded as being kept at a same voltage (i.e. the pulled-down voltage) throughout one display period.

On the other hand, according to the present embodiment, because of the extended first time Δt, during a display period, the low-voltage pixel electrode 11 will be applied with data signal voltage and the pulled-down voltage respectively for an increased time, the corresponding liquid crystal molecules will therefore be hold at two different inclination angles respectively for a sufficient time, and these liquid crystal molecules can render two different states in one display period. The domain number is doubled in such "time division" manner, and better display effect can be achieved. By the creative design of the present invention, the solution in the prior art that holding the direction of the liquid crystal molecules in each domain during a display period is changed, two different orientations are sequentially provided for a domain during a display period, such that one domain may function as two domains and the actual domain number is increased.

Apparently, the liquid crystal molecules corresponding to the low-voltage pixel electrode 11 can be hold at two different inclination angles respectively for a sufficient time during a display period, therefore the visual effect in the display period shall be an average of the visual effects in two time pieces. Under the same data signal voltage, the display contents (i.e. the visible brightness of the liquid crystal pixel unit) respectively obtained using the method of the present embodiment and the prior art are different. In order to maintain consistency in display content, the present embodiment should adjust the data signal voltage, capacitance value of the first shared capacitor CS1 and etc., such as reducing the data signal voltage and/or increasing the capacitance value of the first shared capacitor CS1, which can be calculated by those skilled in the art on the basis of practical requirements, and the details are omitted here.

Preferably, the first time Δt is larger than or equal to ¼ of the display period and smaller than or equal to ¾ of the display period. During research, when the first time Δt is larger than or equal to ¼ of the display period and smaller than or equal to ¾ of the display period, the times that the low-voltage pixel electrode 11 can be kept at two voltages respectively are approximately equivalent to each other, thus the number of domains can be increased and the display effect can be improved to a maximum extent.

Preferably, the first time Δt is larger than or equal to 1/10 of the display period and smaller than or equal to ¼ of the display period. When the first time Δt is larger than or equal to 1/10 of the display period and smaller than or equal to ¼ of the display period, the effect of increasing the number of domains is relatively small (since the reduced duration under the data signal voltage), however, the display content can be adjusted to compensate the display errors caused by inaccurate capacitance values of the storage capacitor and the shared capacitor, etc.

S03, return to step S01 after a display period is finished, start a new display period, and repeat the steps until display is finished.

Embodiment 3

Figure 4:
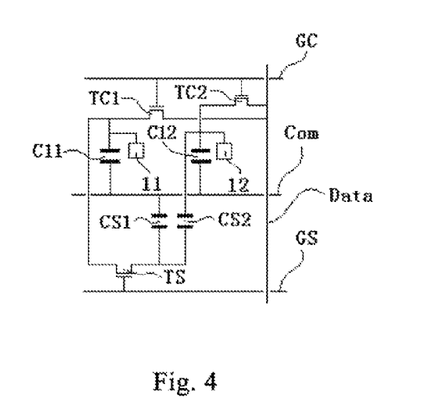
FIG. 4 is an equivalent circuit diagram of another liquid crystal pixel unit of CS-SPVA mode according to embodiment 3 of the present invention.
Figure 5:
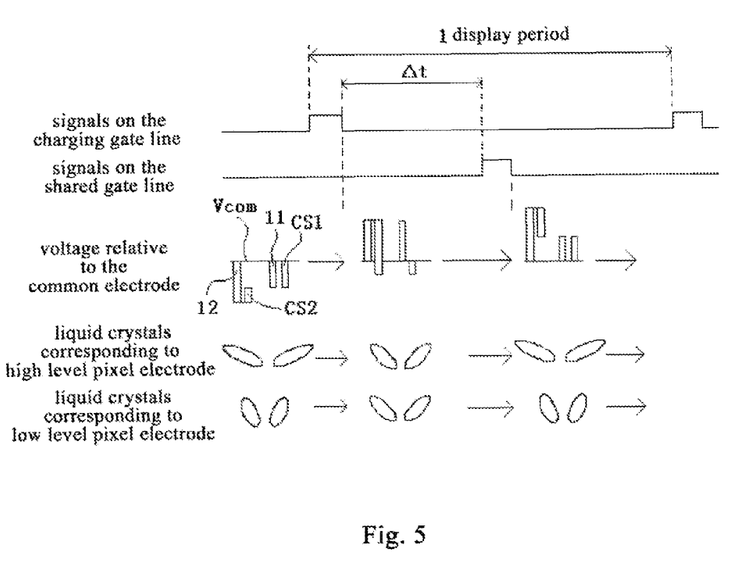
FIG. 5 is a schematic timing sequence of the driving method for liquid crystal pixel unit according to embodiment 3 of the present invention.

As shown in FIGS. 4 and 5, the present embodiment provides a driving method for liquid crystal pixel unit.

As shown in FIG. 4, the liquid crystal pixel unit according to the present embodiment has similar structure to that in above embodiment 2, except that the liquid crystal pixel unit according to the present embodiment further comprises a second shared capacitor CS2. The second shared capacitor CS2 can be electrically connected with the low-voltage pixel electrode 11 and change the voltage on the high-voltage pixel electrode 12 on the arrival of the shared connection signal.

Preferably, one end of the second shared capacitor CS2 is connected with the high-voltage pixel electrode 12, and the other end of the second shared capacitor CS2 is connected to one end of the first shared capacitor CS1 away from the common electrode line Com (i.e. the end connected to the shared thin film transistor TS).

As shown in FIG. 5, the driving method for liquid crystal pixel unit according to the present embodiment provides similar signals to that in above embodiment 2, except that the voltage change procedure is different due to addition of the second shared capacitor CS2.

Specifically, at the end of a display period, the high-voltage pixel electrode 12 has a high voltage, the low-voltage pixel electrode 11 has a low voltage, and the polarities of voltages on the pixel electrodes 11, 12 and the first and second shared capacitors CS1, CS2 are the same (e.g., all the voltages being lower than the common electrode voltage). When the charging connection signal arrives, the pixel electrodes 11, 12 reach the data signal voltage which is higher than the common electrode voltage and has polarity opposite to that in previous display period). The voltage on the first shared capacitor CS1 remains the same polarity, while the voltage on the second shared capacitor CS2 changed its polarity. The shared capacitors CS1, CS2 are connected in series between the common electrode voltage and the data signal voltage, and the voltages thereon depend on their capacitance ratio. When the shared connection signal arrives, the first shared capacitor CS1 and also the second shared capacitor CS2 are electrically connected with the low-voltage pixel electrode 11, the first shared capacitor CS1 pulls down the voltage on the low-voltage pixel electrode 11, and the second shared capacitor CS2 raises the voltage on the high-voltage pixel electrode 12, such that different voltages are provided on the pixel electrodes 11, 12.

According to the present embodiment, by providing the second shared capacitor CS2, the voltage on the low-voltage pixel electrode 11 will drop while the voltage on the high-voltage pixel electrode 12 will rise during one display period. That is, both of the pixel electrodes 11, 12 are hold at two different voltages for sufficient time, thus the increase in the number of domains is enhanced (the number of domains provided by the high-voltage pixel electrode 12 is also doubled) and the display effect is improved better.

Above embodiment are only illustrative examples of the driving method for liquid crystal pixel unit, the liquid crystal pixel unit may adopt other structures; a third pixel electrode to be used as an intermediate voltage pixel electrode or more shared capacitors may be provided. However, those solutions shall be protected by the present invention provided that the liquid crystal pixel unit comprises at least two pixel electrodes, and the respective pixel electrodes can be controlled by the shared connection signal to provide different voltages in the charge shared manner, and the time interval between the charging connection signal and the shared connection signal is larger than or equal to 1/10 of the display period and smaller than or equal to 3/4 of the display period.

Embodiment 4

The present embodiment provides a driving device for liquid crystal pixel unit, the liquid crystal pixel unit comprises a first pixel electrode, a second pixel electrode and a first shared capacitor; the driving device comprises:

a data driving module configured to provide data signal to the liquid crystal pixel unit;

a charging driving module configured to provide charging connection signal to the liquid crystal pixel unit for charging the first and second pixel electrodes to an equivalent voltage using the data signal;

a shared driving module configured to provide a shared connection signal to the liquid crystal pixel unit for electrically connecting the first shared capacitor with the first pixel electrode and changing the voltage on the first pixel electrode;

a time control module configured to control the shared driving module to provide a shared connection signal to the liquid crystal pixel unit with an interval of a first time after the charging connection signal is finished; said first time is larger than or equal to 1/10 of the display period and smaller than or equal to 3/4 of the display period.

The driving device for liquid crystal pixel unit according to the present embodiment has a time control module to perform above driving method for liquid crystal pixel unit, which can provide an increased domain number and compensate the capacitance errors, such that the display effect is improved.

Above modules may be discrete elements or integrated, for example the data driving module may be a data driver IC, the charging driving module, the shared driving module and the time control module may be integrated in a gate driver IC.

It should be noted that although the driving device for the liquid crystal pixel unit according to the present embodiment takes the example of driving one liquid crystal pixel unit, practically a plurality of liquid crystal pixel units can be driven simultaneously. For example, each driving device for the liquid crystal pixel unit may comprises a plurality of data driver ICs and gate driver ICs, and each driver IC is provided with a plurality of leading wires.

Preferably, the liquid crystal pixel unit is a liquid crystal pixel unit of VA mode.

Preferably, the liquid crystal pixel unit further comprises: a second shared capacitor, said second shared capacitor is electrically connected with the first pixel electrode on arrival of the shared connection signal, and the voltage on the second pixel electrode is changed.

Preferably, the data signal provided from the data driving module to the liquid crystal pixel unit has reversed polarities in two adjacent display periods.

The foregoing embodiments are merely illustrative for explaining the principle of the present invention, but the protection scope of the present invention is not limited thereto. Various modification and improvement will be easily conceived by a person skilled in the art without departing the spirit and substance of the present invention, and these modification and improvement shall fall into the protection scope of the present invention.

The invention claimed is:

1. A driving device for liquid crystal pixel unit, the liquid crystal pixel unit comprises a first pixel electrode, a second pixel electrode and a first shared capacitor; the driving device comprises:

a data driving module configured by a data driving IC for providing data signal to the liquid crystal pixel unit;

a charging driving module configured by a gate driving IC for providing a charging connection signal to the liquid crystal pixel unit for charging the first and second pixel electrodes to an equivalent voltage using the data signal;

a shared driving module configured by a gate driving IC for providing a shared connection signal to the liquid crystal pixel unit for electrically connecting the first shared capacitor with the first pixel electrode and changing the voltage on the first pixel electrode;

a time control module configured by a gate driving IC for controlling the shared driving module to provide the shared connection signal to the liquid crystal pixel unit with an interval of a first time after the charging connection signal is finished; said first time is no less than 1/10 of a display period and no more than 3/4 of the display period.

2. The driving device for liquid crystal pixel unit according to claim 1, wherein, the liquid crystal pixel unit is a liquid crystal pixel unit of vertical alignment mode.

3. The driving device for liquid crystal pixel unit according to claim 1, wherein, the first pixel electrode is connected to the drain of a first charging thin film transistor, the second pixel electrode is connected to the drain of a second charging thin film transistor;

the sources of the first charging thin film transistor and the second charging thin film transistor are connected with a same data line, the gates thereof are connected with a same charging gate line, said data line is used for providing the data signal, said charging gate line is used for providing the charging connection signal.

4. The driving device for liquid crystal pixel unit according to claim 1, wherein, the first pixel electrode is connected to one end of the first shared capacitor through a shared thin film transistor, the other end of the first shared capacitor is connected with a common electrode line, the gate of the shared thin film transistor is connected with a shared gate line, said shared gate line is used for providing the shared connection signal.

5. The driving device for liquid crystal pixel unit according to claim 1, wherein the liquid crystal pixel unit further comprising:

a second shared capacitor, said second shared capacitor is electrically connected with the first pixel electrode by control of the shared connection signal, and the voltage on the second pixel electrode is changed.

6. The driving device for liquid crystal pixel unit according to claim 5, wherein, the first pixel electrode is connected to one end of the first shared capacitor through a shared thin film transistor, the other end of the first shared capacitor is connected with a common electrode line, the gate of the shared thin film transistor is connected with a shared gate line, said shared gate line is used for providing the shared connection signal;

one end of the second shared capacitor is connected with the second pixel electrode, and the other end of the second shared capacitor is connected to one end of the first shared capacitor away from the common electrode line.

7. The driving device for liquid crystal pixel unit according to claim 1, wherein,
each pixel electrode corresponds to at least two orientation domains.

8. The driving device for liquid crystal pixel unit according to claim 1, wherein,
said first time is controlled by the time control module to be larger than or equal to 1/10 of the display period and smaller than or equal to 1/4 of the display period.

9. The driving device for liquid crystal pixel unit according to claim 1, wherein
said first time is controlled by the time control module to be no less than 1/4 of the display period and no more than 3/4 of the display period.

10. A liquid crystal display device comprising the driving device for liquid crystal pixel unit according to claim 1.

11. A driving method for liquid crystal pixel unit, the liquid crystal pixel unit comprises a first pixel electrode, a second pixel electrode and a first shared capacitor; the driving method comprising:
providing a charging connection signal for charging the first and second pixel electrodes to an equivalent voltage using a data signal;
providing a shared connection signal with an interval of a first time after the charging connection signal is finished, said charging connection signal electrically connecting the first shared capacitor with the first pixel electrode and thus changing the voltage on the first pixel electrode;
wherein said first time is no less than 1/10 of a display period and no more than 3/4 of the display period.

12. The driving method for liquid crystal pixel unit according to claim 11, wherein, the liquid crystal pixel unit further comprising a second shared capacitor, said second shared capacitor is electrically connected with the first pixel electrode at the step of providing the shared connection signal, and the voltage on the second pixel electrode is changed.

13. The driving method for liquid crystal pixel unit according to claim 11, wherein,
said first time is no less than 1/10 of the display period and no more than 1/4 of the display period.

14. The driving method for liquid crystal pixel unit according to claim 11, wherein,
said first time is no less than 1/4 of the display period and no more than 3/4 of the display period.

15. The driving method for liquid crystal pixel unit according to claim 11, wherein, the liquid crystal pixel unit performs polarity reversion in two adjacent display periods.

16. The driving method for liquid crystal pixel unit according to claim 11, wherein the driving method is used for driving liquid crystal pixel unit of vertical alignment mode.

* * * * *